(12) United States Patent  
Sauerbrei et al.

(10) Patent No.: US 9,101,831 B2
(45) Date of Patent: Aug. 11, 2015

(54) VIDEO GAME AND PERIPHERAL FOR SAME

(75) Inventors: Peter J. Sauerbrei, Chicago, IL (US);
Patrick Dwyer, Chicago, IL (US);
Arnab Sen, Santa Monica, CA (US);
David M. Tibbetts, Chicago, IL (US)

(73) Assignee: Activision Publishing, Inc., Santa Monica, CA (US)

( * ) Notice: Subject to any disclaimer, the term of this patent is extended or adjusted under 35 U.S.C. 154(b) by 871 days.

(21) Appl. No.: 12/625,446

(22) Filed: Nov. 24, 2009

(65) Prior Publication Data

US 2011/0124387 A1 May 26, 2011

(51) Int. Cl.
*A63F 13/06* (2006.01)
*A63F 13/40* (2014.01)
*A63F 13/20* (2014.01)

(52) U.S. Cl.
CPC ............... *A63F 13/10* (2013.01); *A63F 13/06* (2013.01); *A63F 2300/105* (2013.01); *A63F 2300/1006* (2013.01); *A63F 2300/1062* (2013.01); *A63F 2300/6045* (2013.01); *A63F 2300/8041* (2013.01)

(58) Field of Classification Search
CPC . A63F 13/06; A63F 13/10; A63F 2300/1006; A63F 2300/8041; A63F 2300/1062; A63F 2300/6045; A63F 2300/105
USPC ............... 463/36, 37; 340/686.6; 482/146
See application file for complete search history.

(56) References Cited

U.S. PATENT DOCUMENTS

| | | | |
|---|---|---|---|
| 4,817,950 A * | 4/1989 | Goo ............................... 463/36 |
| 4,906,192 A | 3/1990 | Smithard et al. | |
| 4,925,189 A | 5/1990 | Braeunig | |
| 4,966,364 A * | 10/1990 | Eggenberger ............... 482/146 |
| 5,049,079 A | 9/1991 | Furtado et al. | |
| 5,059,958 A | 10/1991 | Jacobs et al. | |
| 5,139,261 A * | 8/1992 | Openiano ...................... 463/36 |
| 5,181,181 A | 1/1993 | Glynn | |
| 5,252,068 A | 10/1993 | Gryder | |
| 5,329,276 A | 7/1994 | Hirabayashi | |
| 5,405,152 A | 4/1995 | Katanics et al. | |
| 5,409,226 A | 4/1995 | Mesko et al. | |
| 5,508,774 A * | 4/1996 | Klees ............................. 396/1 |
| 5,516,105 A | 5/1996 | Eisenbrey et al. | |
| 5,547,382 A | 8/1996 | Yamasaki et al. | |
| 5,602,569 A | 2/1997 | Kato | |
| 5,615,132 A | 3/1997 | Horton et al. | |
| 5,713,794 A | 2/1998 | Shimojima et al. | |

(Continued)

OTHER PUBLICATIONS

Internet Home page. members.surfbest.net/surfwave@surfbest.net. Printed Jun. 11, 2008 (1 sheet).

(Continued)

*Primary Examiner* — Jasson Yoo
(74) *Attorney, Agent, or Firm* — Klein, O'Neill & Singh, LLP

(57) ABSTRACT

A video game controller with a position sensor and a proximity sensor provides user input signals for use in determining game states. The video game controller can have a board or deck-like surface similar to that of a skateboard, and the proximity sensor can be used to determine if a user is in contact with or near the board. A video game associated with the video game controller can provide a skateboard or other game in which a skateboard and skateboarding character are responsive to a game player's manipulation of the video game controller.

22 Claims, 7 Drawing Sheets

(56) References Cited

U.S. PATENT DOCUMENTS

| | | | |
|---|---|---|---|
| 5,798,703 A * | 8/1998 | Sakai et al. | 340/666 |
| 5,819,206 A | 10/1998 | Horton et al. | |
| 5,860,861 A * | 1/1999 | Lipps et al. | 463/36 |
| 5,913,727 A | 6/1999 | Ahdoot | |
| 5,982,352 A * | 11/1999 | Pryor | 345/156 |
| 6,022,272 A | 2/2000 | Sano | |
| 6,028,593 A | 2/2000 | Rosenberg et al. | |
| 6,091,402 A * | 7/2000 | Howell | 345/157 |
| 6,137,468 A | 10/2000 | Martinez et al. | |
| 6,139,473 A | 10/2000 | Koyama et al. | |
| 6,142,870 A | 11/2000 | Wada et al. | |
| 6,227,968 B1 * | 5/2001 | Suzuki et al. | 463/7 |
| 6,270,403 B1 | 8/2001 | Watanabe et al. | |
| 6,368,217 B2 | 4/2002 | Kanno et al. | |
| 6,471,584 B1 | 10/2002 | Wada et al. | |
| 6,471,586 B1 | 10/2002 | Aiki et al. | |
| 6,475,083 B1 | 11/2002 | Gomez et al. | |
| 6,543,769 B1 * | 4/2003 | Podoloff et al. | 273/148 B |
| 6,545,661 B1 | 4/2003 | Goschy et al. | |
| 6,597,342 B1 | 7/2003 | Haruta | |
| 6,634,947 B1 | 10/2003 | Miyamoto et al. | |
| 6,739,974 B2 | 5/2004 | Kanno et al. | |
| 6,836,329 B1 * | 12/2004 | Ziemins et al. | 356/399 |
| 6,908,386 B2 | 6/2005 | Suzuki et al. | |
| 7,169,998 B2 | 1/2007 | Kondo et al. | |
| 7,223,173 B2 | 5/2007 | Masuyama et al. | |
| 7,379,841 B2 | 5/2008 | Ohta | |
| 2002/0180166 A1 * | 12/2002 | Voss | 280/5.5 |
| 2005/0076161 A1 | 4/2005 | Albanna et al. | |
| 2005/0119036 A1 | 6/2005 | Albanna et al. | |
| 2006/0019753 A1 | 1/2006 | Ohta | |
| 2006/0052165 A1 | 3/2006 | Ohta | |
| 2006/0091310 A1 * | 5/2006 | Furry | 250/330 |
| 2006/0183546 A1 | 8/2006 | Addington et al. | |
| 2006/0258458 A1 * | 11/2006 | Addington et al. | 463/36 |
| 2006/0281549 A1 | 12/2006 | Iwamoto et al. | |
| 2006/0287089 A1 * | 12/2006 | Addington et al. | 463/37 |
| 2007/0049374 A1 | 3/2007 | Ikeda et al. | |
| 2007/0050597 A1 | 3/2007 | Ikeda | |
| 2007/0060391 A1 | 3/2007 | Ikeda et al. | |
| 2007/0072680 A1 | 3/2007 | Ikeda | |
| 2007/0155495 A1 * | 7/2007 | Goo | 463/36 |
| 2007/0211025 A1 | 9/2007 | Sato | |
| 2007/0213127 A1 | 9/2007 | Sato | |
| 2007/0243931 A1 | 10/2007 | Ohta et al. | |
| 2007/0265084 A1 | 11/2007 | Sato et al. | |
| 2007/0265085 A1 | 11/2007 | Miyamoto et al. | |
| 2008/0015017 A1 | 1/2008 | Ashida et al. | |
| 2008/0064109 A1 | 3/2008 | Okamura | |
| 2008/0064498 A1 | 3/2008 | Okamura | |
| 2008/0214305 A1 | 9/2008 | Addington et al. | |
| 2009/0227426 A1 * | 9/2009 | Dubar | 482/34 |
| 2010/0107958 A1 * | 5/2010 | Rhodes et al. | 114/312 |
| 2010/0238041 A1 * | 9/2010 | Acedo et al. | 340/686.6 |

OTHER PUBLICATIONS

The Interactive Surfboard TV Game. Hammacher Schlemmer Online Catalogue. www.hammacher.com/publish/74324.asp. Printed Jun. 11, 2008 (1 sheet).

Photograph showing side of SKIMAXX Water-Ski Simulator.

Photograph showing front of SKIMAXX Water-Ski Simulator.

Photograph showing Wakiki Wipeout Surfboard for plug-and-play video game.

Photograph showing bottom of Wakiki Wipeout Surfboard.

Photograph showing circuit board in Wakiki Wipeout Surfboard.

Miller, Chuck. "Console Specialty Controller Roundup." Dec. 4, 2007 Gamespy.com. archive.gamespy.com/hardware/december02/consolespecial/. p. 1. Printed Apr. 14, 2009 (3 sheets).

Miller, Chuck. "Console Specialty Controller Roundup." Dec. 4, 2007 Gamespy.com. archive.gamespy.com/hardware/december02/consolespecial/. p. 2. Printed Apr. 14, 2009 (4 sheets).

Miller, Chuck. "Console Specialty Controller Roundup." Dec. 4, 2007 Gamespy.com. archive.gamespy.com/hardware/december02/consolespecial/. p. 3. Printed Apr. 14, 2009 (3 sheets).

Miller, Chuck. "Console Specialty Controller Roundup." Dec. 4, 2007 Gamespy.com. archive.gamespy.com/hardware/december02/consolespecial/. p. 4. Printed Apr. 14, 2009 (3 sheets).

Senario Silver Surfer Stand on Game. Target. www.target.com/Senario-Silver-Surfer-Stand-Game/dp/B000RWEF2k. Printed Apr. 14, 2009 (3 sheets).

Instruction Manual. "Qmotions Xboard Quicket Start Guide for PS2" (1 sheet).

Instruction Manual. "Configuring the Qmotions-Xboard to Work with the Tony Hawk's American Wasteland Game" (2 sheets).

Instruction Manual. "Radica: SSX Snowboarder." (3 sheets).

SEGA Enterprises, LTD. Wiring Diagrams. (3 sheets).

SEGA Enterprises, LTD. Air Trix Brochure (2 sheet).

SEGA Enterprises, USA. "Top Skater Sega Skateboarding: Owner's Manual." Manual No. 4201-6308-01 (107 pages).

SEGA Enterprises, Inc. USA. "Air Trix: Owner's Manual." Manual No. 420-6614-01 (166 pages).

Knight; "Amiga Joyboard." www.amigahistory.co.uk/joyboard.html Printed Apr. 22, 2009 (2 sheets).

Atariage. "Mogul Maniac." www.atariage.com/manual_html_page.html?SoftwareLabelID=309 Printed Apr. 22, 2009 (3 sheets).

\* cited by examiner

VIDEO GAME AND PERIPHERAL FOR SAME

BACKGROUND OF THE INVENTION

The present invention generally relates to video games, and more particularly to a video game and a peripheral for a video game.

Video games provide fun and enjoyment for many. Video games allow game players to participate in a variety of simulated activities, including those that the game players may not be able or desire to experience directly, whether due to cost, danger, or equipment concerns, or simply due to inadequate time or ability to obtain sufficient proficiency in an activity.

Video games often include video game hand-held controllers which game players manipulate as part of game play. The controllers often include a variety of input devices, such as digital buttons and analog sticks, which allow game players to provide a variety of input commands for game play. The controllers are useful in that they allow game players to play a variety of video games all making use of the same controller.

The use of a generic controller, however, may detract from enjoyment of an overall simulated environment. Unfortunately, video game developers must often support a controller associated with a specific video game console, and the video game console itself may be particularly configured for communications from or with the controller. Moreover, real world items may be unsuitable for adaptation for use in a video game environment.

BRIEF SUMMARY OF THE INVENTION

The invention provides a video game and a peripheral for a video game. One aspect of the invention provides a video game system, comprising: a video game controller in the form of a housing with an elongate upper surface having a substantially flat portion for a user standing thereupon, the housing containing a position related sensing device, an object proximity sensing device, a signal transmitter, and circuitry coupling the position related sensing device and the object proximity sensing device with the signal transmitter such that the signal transmitter may transmit signals indicative of information of the position related sensing device and signals indicative of information of the object proximity sensing device; a video game console including a processor configured by program instructions to command display of a game character performing operations using a board in a virtual environment based on values of the signals indicative of information of the position related sensing device and values of the signals indicative of information of the object proximity sensing device, with the game character performing different operations using the board for different combinations of values of the signals indicative of information of the position related sensing device and the values of the signals indicative of information of the object proximity sensing device.

Another aspect of the invention provides a video game system, comprising: a housing including a position related sensing device, an object proximity sensing device, and a transmitter to transmit information indicative of information of the position related sensing device and information indicative of information of the object proximity sensing device; and a processor configured by program instructions to command display of a game character performing different tricks using a board for different combinations of values of the information indicative of information of the position related sensing device and the information indicative of the information of the object proximity sensing device.

In another aspect the invention provides a peripheral for a video game, comprising: a housing including at least one surface providing a deck; at least one position related sensing device fixedly coupled to the housing to provide housing position related information; at least one proximity sensor to provide object detection information of objects proximate to the housing, the object detection information including information indicative of distance between the object and the housing; circuitry coupled to the proximity sensor, the circuitry configured to generate a signal indicative of which of a plurality of ranges of distances the distance between the object and the housing is within; and a transmitter to transmit information of the housing position related information and information of the signal indicative of which of a plurality of ranges the distance between the object and the housing is within.

These and other aspects of the invention are more fully comprehended upon review of this disclosure.

DETAILED DESCRIPTION

Figure 1:
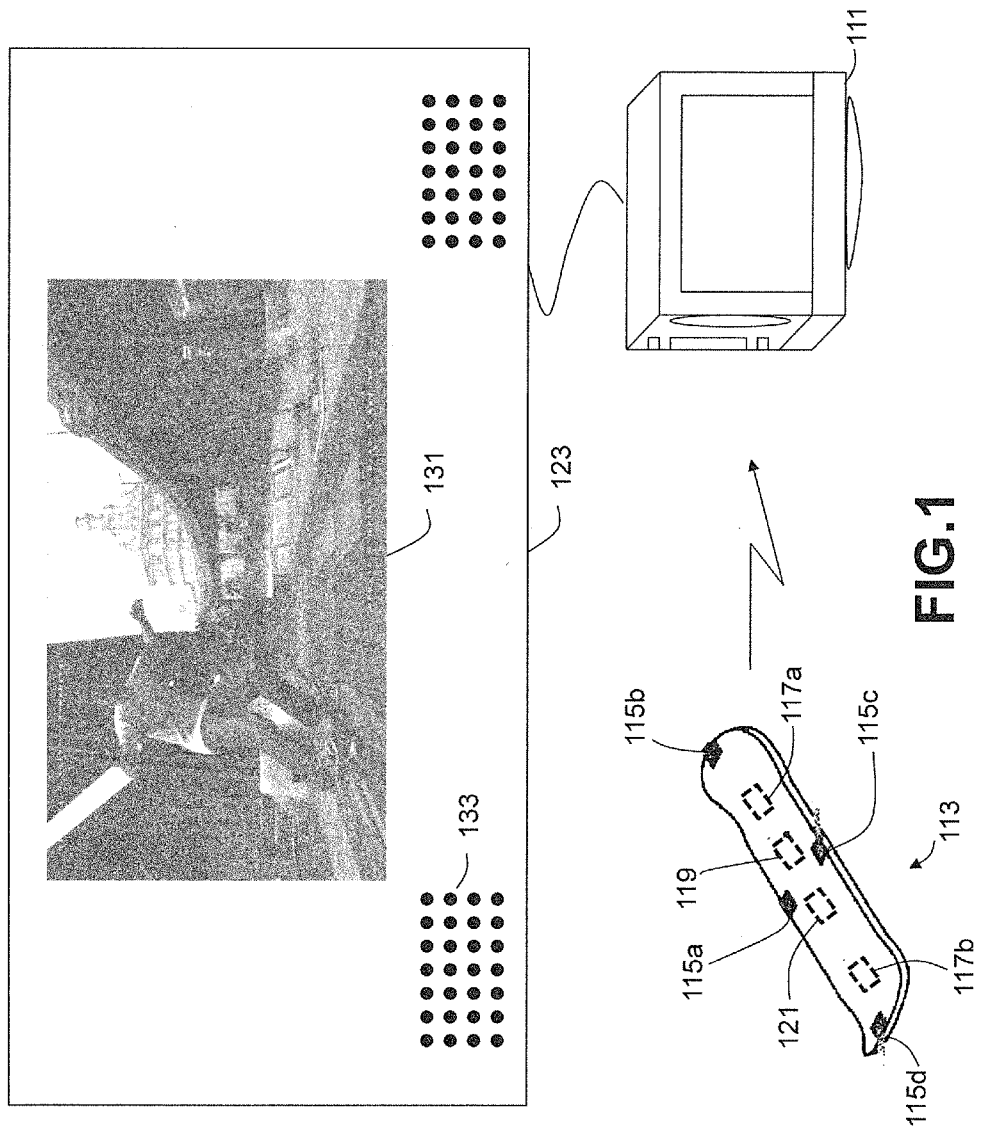
FIG. 1 is an example of a video game system in accordance with aspects of the invention.

FIG. 1 is an example of a video game system in accordance with aspects of the invention. The video game system includes a game console 111 with a processor and associated circuitry for executing instructions controlling game play. The instructions controlling game play are generally stored on removable media, for example, an optical disk. Accordingly, the game console may include an optical drive, for example, a DVD-ROM drive, for reading the instructions for game play. In some embodiments, the game console may be a handheld gaming device, including similar internal circuitry as herein described, as well as, for example, a built in display or displays and various different user input devices, and in some embodiments a personal computer or the like may be used instead of a game console.

A video game controller 113 is also included in the video game system. The video game controller, in one embodiment, has a board-like shape and resembles a skateboard or, in some embodiment, a snowboard. The video game controller generally includes processing circuitry, which may be a processor 119 or other processing circuitry. The processor may execute instructions according to firmware that is also stored in the video game controller. A wireless transmitter 121, or in some embodiments a wired transmitter, included in the video game controller sends controller information to the game console. The wireless transmitter may send information as controlled by the processor. The video game controller includes position related sensors. The position related sensors may provide position information, or information related to position or change in position, such as information related to motion or acceleration. In some embodiments, and as in FIG. 1, the position related sensors are accelerometers 117a, 117b. The accelerometers may be three-axis accelerometers. The processor may process and combine signals from the accelerometers to determine at least some controller information to be sent to the game console. In some embodiments, other types of position related sensors, for example, geomagnetic sensors, are included in the video game controller.

Proximity sensors 115a-d are also included in the video game controller. The embodiment illustrated in FIG. 1 includes four proximity sensors, a front sensor, a rear sensor, a left sensor, and a right sensor. Each of the proximity sensors senses when an object is near the sensor. The object may be, for example, a game player's hand or foot. The proximity sensors may be, for example, infrared sensors, ultrasound sensors, or sonar sensors. The processor may process signals from the proximity sensors to determine at least some controller information to be sent to the game console. In some embodiments, the proximity sensors distinguish when an object is sufficiently close to the proximity sensor to be considered in contact with the sensor, near the sensor, or more distant from the sensor. In some embodiments the proximity sensors are infrared sensors, in other embodiments the proximity sensors are ultrasonic sensors, and in other embodiments the proximity sensors are other proximity sensors.

A display device 123 is also included in the video game system. The display device is generally coupled to the video game console by a cable, although in some embodiments a wireless connection may be used. In many embodiments, the display device is a television. The display device, in the illustrated embodiment, includes a speaker 133 and commonly two or more speakers. A display screen 131 of the display device displays video images of game play. In the embodiment of FIG. 1, the display screen shows a screen shot of video game play of a skateboarding video game. As illustrated, the screen shot shows a front view of a skateboard ridden by a skateboarder in a cityscape.

The game player generally stands on a flat portion of the upper surface of the video game controller during game play. At some times during game play, the game player may stand or place weight on the upturned ends of the video game controller, or place or move feet about sides of the video game controller. Motion (and/or position) of the video game controller, as indicated for example by the accelerometers, is used, for example by the processor of the game console, to determine a game character's actions and/or movement (and/or position) of a board associated with the game character in a game, and the actions and/or movement (and/or position) of the board are generally displayed on the display, for example as commanded by the processor of the game console. Thus the processor may be considered as commanding display of the game character operating the board. In some instances the character may be navigating the board in a virtual game environment by making turns with the board, riding the board forward (or backwards), stopping the board, or otherwise generally performing board navigation operations by translating the board through space of the virtual game environment. In other instances, the character may be performing tricks with the board, namely performing board trick operations, for example by rotating, flipping, ollieing, performing manuals, or grabbing the board, while also navigating the board in various embodiments. Thus, the game character may perform board navigation operations or board trick operations, or both.

For example, in a skateboarding video game when the video game controller is tilted to the left as indicated by the accelerometers, a skateboard in the video game may be displayed as turning, or navigating, to the left in a virtual game environment. Additionally, game actions may be triggered when a game player touches or moves near the video game controller, as indicated by the proximity sensors. In some embodiments the game character performs different tricks based upon a combination of current proximity sensor output values and previous or current accelerometer output values, and the tricks may also depend on a range of proximity as indicated by the proximity sensor. Further, depending on game play state, different combinations of proximity sensor output values and accelerometer output values may result in different game character tricks. For example, a proximity sensor output value indicating an object close to a front of a board while an accelerometer output value indicates a raised front of the board may result in a game character first trick in a first game state and a second trick in a second game state. And a proximity sensor output value indicating an object further from the front of the board in otherwise similar circumstances may result in a third trick and a fourth trick, respectively.

Figure 2:
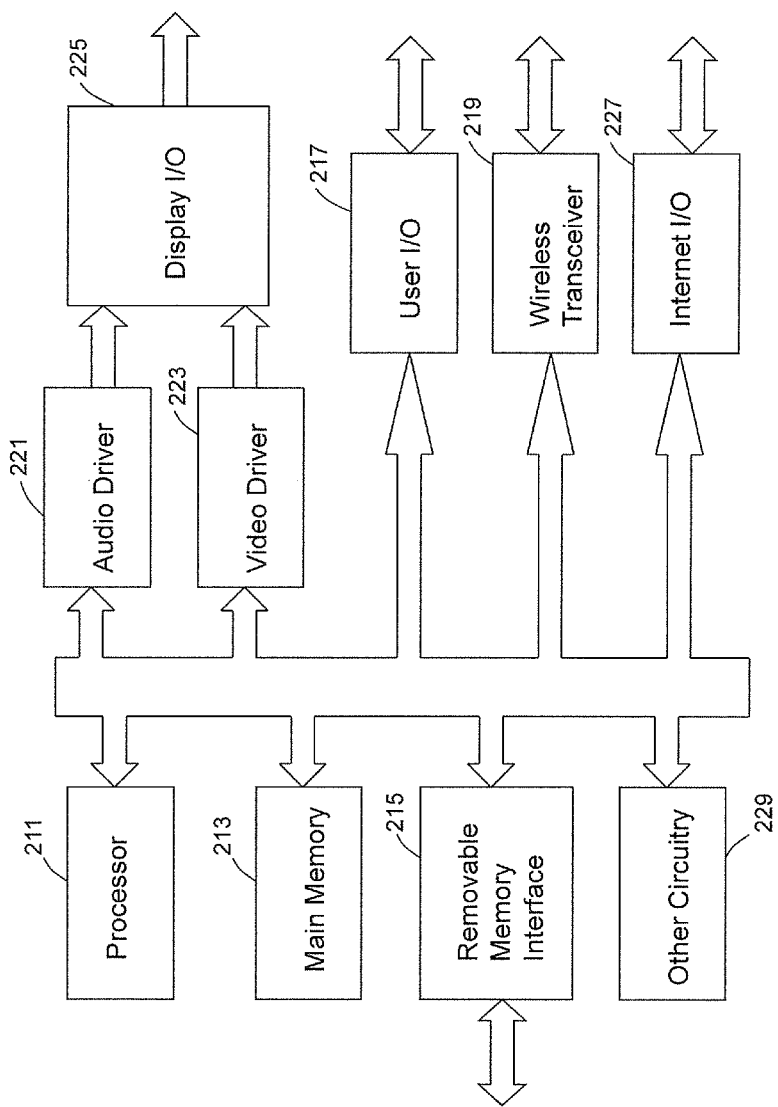
FIG. 2 is an example of a block diagram of a game console processing unit in accordance with aspects of the invention.

FIG. 2 is an example of a block diagram of a game console processing unit in accordance with aspects of the invention. The game console includes a processor 211 that is connected to other components of the game console via a bus. The other components include a main memory 213 and a removable memory device 215. The processor may execute instructions from the removable memory device 215 to control game play and store game state information in the main memory. For example, the game play may be for a skateboarder with the instructions controlling possible movements, positions, and locations of a game character and/or skateboard associated with or operated by the game character.

The processor is coupled to an audio driver 221 and a video driver 223. The audio driver produces sound signals and the video driver produces image signals. The sound signals and image signals are transmitter from the game console via a display I/O device 225. The display I/O device generally supplies the sound and image signals to a display device external to the game console.

The game console may also include a user I/O device 217, a wireless transceiver 219, an Internet I/O device 227, and other circuitry 229. The wireless transceiver may receive control signals from a video game controller that signals actions of a game player. Alternatively or additionally, the game console may receive game player actions via the user I/O device. The Internet I/O device provides a communication channel that may be used, for example, for multiple player games. The other circuitry may include status indicators, such as colored lights.

Figure 3:
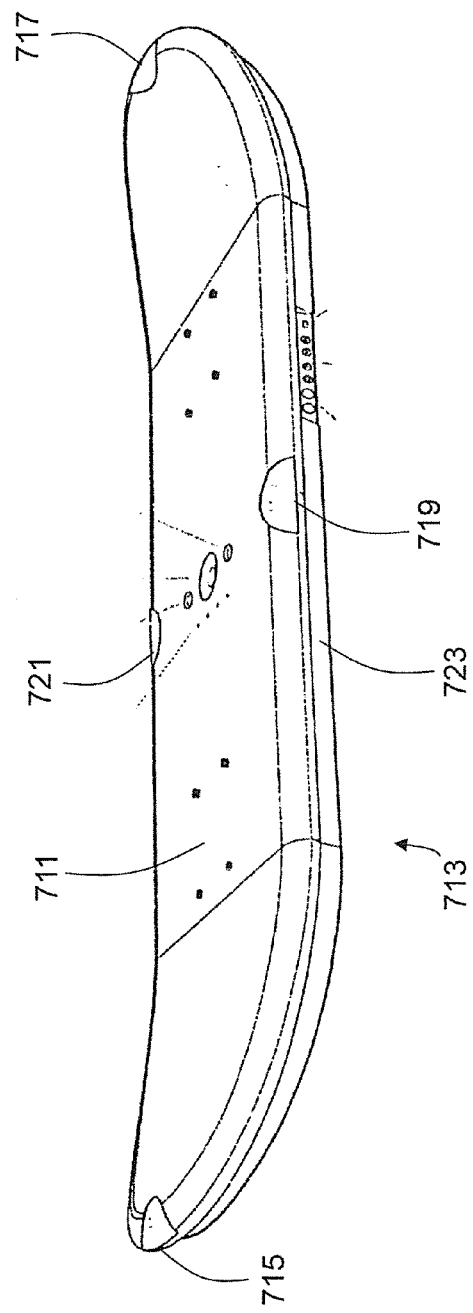
FIG. 3 shows a board peripheral in accordance with aspects of the invention.

FIG. 3 is a perspective view of a peripheral in accordance with aspects of the invention. The peripheral serves as a video game controller. The peripheral is generally in the shape of a deck of a skateboard. In other embodiments the peripheral is generally in the shape of a snowboard. In many embodiments, the peripheral is somewhat shorter longitudinally than many skateboards, and the peripheral may have a length, for example, of 70 centimeters. The peripheral includes an upper surface 711 and a lower surface 713 coupled by sidewalls 723. The peripheral includes electronic circuitry, for example, a processor and a transceiver for communication with a video game console. The upper surface includes a substantially flat central portion longitudinally bounded by slightly upturned ends. In operation, feet of a game player are generally located on or about the upper surface, including on or about the flat central portion, on or about either or both upturned ends, or at times to either side of the peripheral.

In some embodiments four proximity sensors, in many embodiments infrared sensors, are located at edges of the peripheral, with a front proximity sensor 715 at a forward edge of the peripheral, a rear proximity sensor 717 at a rear edge of the peripheral, a left proximity sensor 717 at a midpoint of a left side of the peripheral, and a right proximity sensor 719 at a midpoint of a right side of the peripheral. As illustrated in FIG. 3, covers are provided for the sensors, with the covers generally increasing smoothness of the surface of the peripheral, however, in other embodiments no covers may be provided. The proximity sensor may indicate presence of an object within defined distances of the sensor, with the distances depending on the particular sensor, mounting of the sensor, and related considerations.

Figure 4:
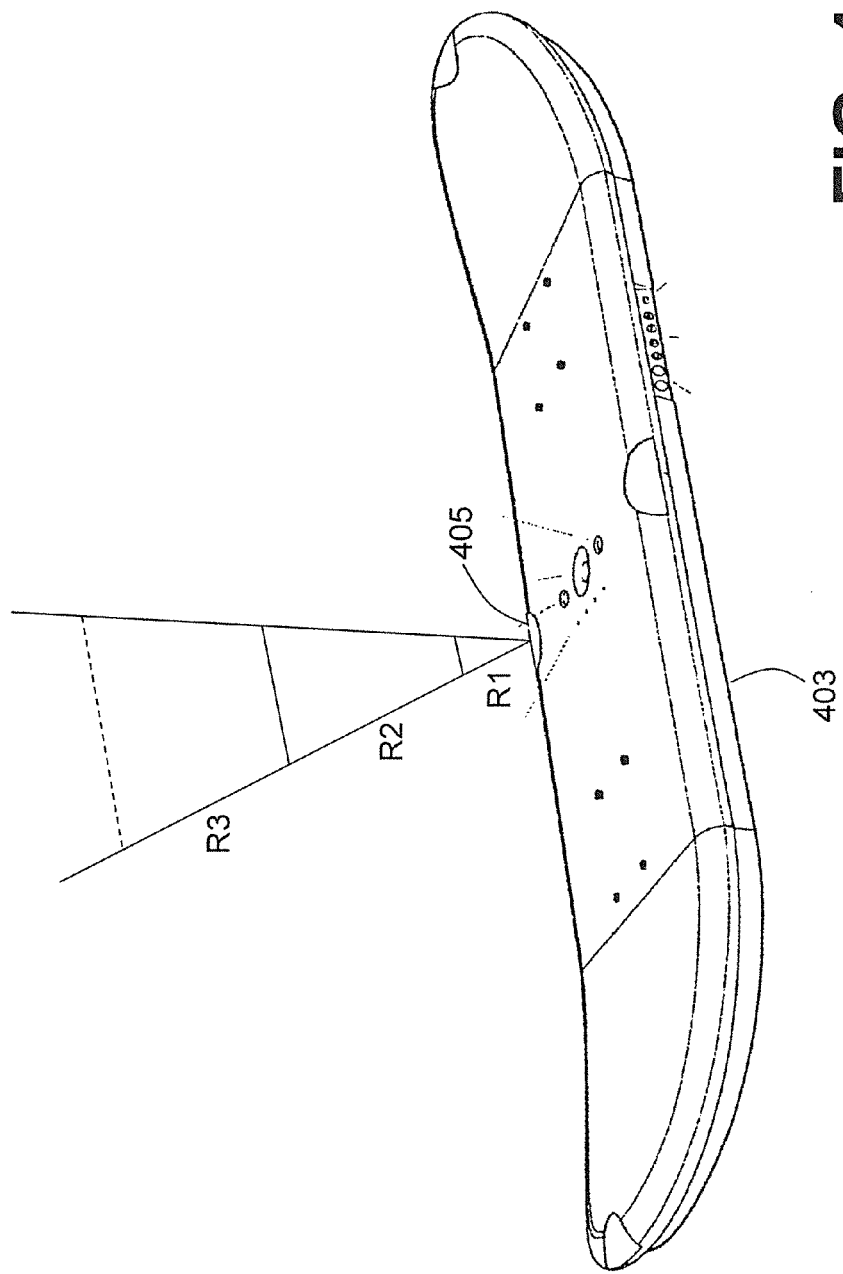
FIG. 4 shows a diagram of a board peripheral and ranges of distance for a proximity sensor in accordance with aspects of the invention.

FIG. 4 is a diagram illustrating an example of proximity sensor ranges of distances with respect to a board in accordance with aspects of the invention. A proximity sensor 405 is located on an edge of a video game controller 403. The proximity sensor, or circuitry associated with the proximity sensor (which in many cases may be considered to be part of the proximity sensor), measures whether an object is near the sensor and when an object is near, measures the distance from the proximity sensor to the object. The object may be a game player's hand or foot. In some embodiments, the proximity sensor, or additional circuitry, quantizes the measured distance into a limited number of discrete ranges of distances, with the limited number of discrete ranges of distances generally being less than the number of potential ranges determinable by the proximity sensor. For example, as illustrated in FIG. 4, the proximity sensor measures whether an object is within a first range R1, within a second range R2, within a third range R3, or more distant. The first range may extend approximately five centimeters from the proximity sensor. This range may indicate, for example, that a game player's hand is contacting the video game controller. The second range may extend approximately from five to twenty centimeters from the proximity sensor. This range may indicate, for example, that a game player's foot is passing the video game controller in a pushing motion. The third range may extend approximately from twenty-five to fifty centimeters from the proximity sensor. This range may indicate, for example, that a game player's hand is grabbing or extending toward the video game controller.

In one embodiment, the proximity sensor utilizes infrared light. An infrared transmitter sends light from the proximity sensor, and an infrared receiver senses light reflected from an object back to the proximity sensor. The light sensed by the infrared receiver varies with the location of the reflecting object. The proximity sensor may use, for example, the angle of the light, the intensity of the light, or the time from transmission to reception to measure the distance from the proximity sensor to the reflecting object. The infrared receiver supplies a signal with a strength that varies with the distance to the reflecting object. In an embodiment where the proximity sensor quantizes the measured distance, thresholds are applied to the signal from the infrared receiver.

Figure 5:
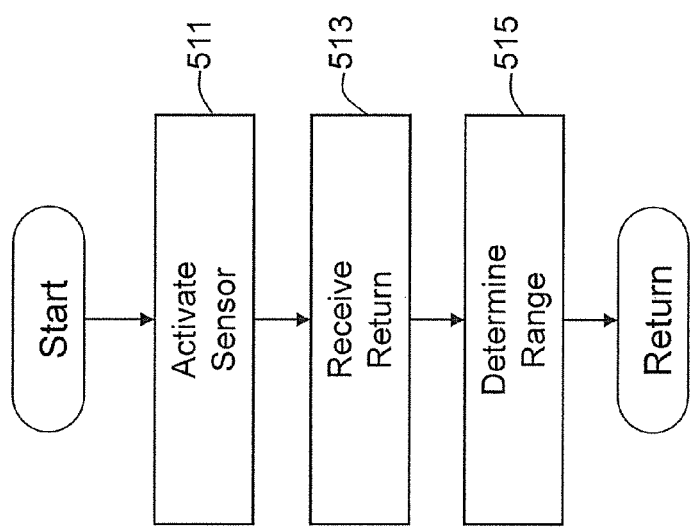
FIG. 5 is a flowchart of a process for measuring proximity in accordance with aspects of the invention.

FIG. 5 is a flowchart of a process for measuring proximity in accordance with aspects of the invention. In some embodiments, the process is performed by a video game controller, by a video game console, or partially by a video game controller and partially by video game console. Additionally, the process may be performed by hardware, software, or a combination of hardware and software. The process utilizes a proximity sensor, for example one of the proximity sensors of the embodiment of FIG. 1. In some embodiments the proximity sensors are infrared sensors.

In block 511, the process activates the proximity sensor. In some embodiments, activating the sensor causes continuous emission of infrared light from the proximity sensor. In other embodiments, an activated sensor may emit pulses of infrared light. In various embodiments pulses of infrared light may be timed with respect to pulses of light of other proximity sensors, for example to reduce the possibility of interference or cross-talk between sensors. Activation of the proximity sensor may include supplying electrical power to the proximity sensor.

In block 513, the process receives a return signal. The return signal is a reflection, when an object is near the proximity sensor, of the light emitted when the proximity sensor was activated in block 511. In one embodiment, the process receives the return signal through a lens and an array of photo sensors to produce a signal indicative of the angle of the return. When the light is reflected from a more distant object, a more acute angle of return results. In another embodiment, the process receives the return signal with a photo sensor to produce a signal indicative of the intensity of the return. When the light is reflected from a more distant object, less intense light is returned.

In block 515, the process determines if an object is near the proximity sensor and when an object is near, a distance to the object. The process utilizes the return signal received in block 513 to determine an indication of the distance from the proximity sensor to an object. In one embodiment, the process applies thresholds to the signal from block 513 and the determined distance is quantized into a few ranges, for example, fewer than three ranges, three ranges, or four ranges. The process thereafter returns.

Figure 6:
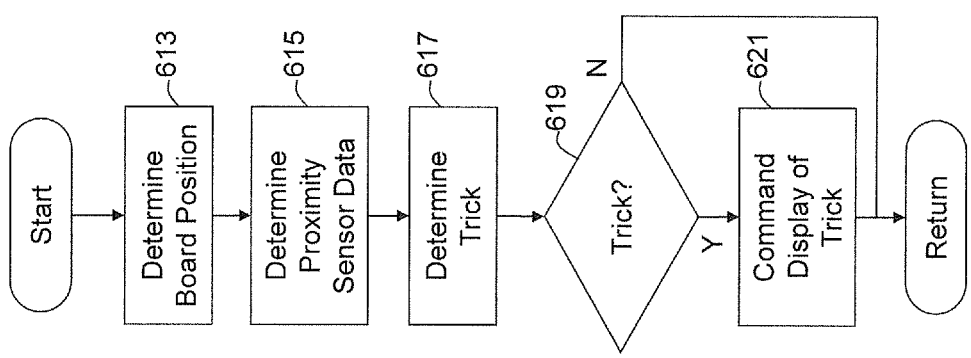
FIG. 6 is a flowchart of a process for processing proximity sensor inputs and position information in accordance with aspects of the invention.

FIG. 6 is a flowchart of a process for processing proximity sensor inputs and position information in accordance with aspects of the invention. In some embodiments, the process is performed by a video game controller, for example circuitry of the video game controller, by a video game console, for example a processor of the video game console, or partially by a video game controller and partially by a video game console. In some embodiments, the process utilizes a video game controller, such as the board-like controller of the embodiment of FIG. 1.

In block 613, the process determines position of the video game controller. The process may acquire accelerometer data to utilize in determining the position of the video game controller. In one embodiment, the process reads data from accelerometers in the video game controller. Preferably, the accelerometers are three-axis accelerometers and each accelerometer provides three measurements. Each measurement indicates the acceleration of the video game controller at the location of the accelerometer. The process determines the position of the video game controller from the accelerometer measurements via calculations using Newtonian physics equations. In some embodiments, the process may optionally or additionally receive measurements from a geomagnetic sensor and utilize geomagnetic measurements to determine the position of the video game controller.

In block 615, the process processes proximity sensor data. In some embodiments, the proximity sensor data is processed using the process of FIG. 5. Additionally, the process may process proximity sensor data for a plurality of sensors, for example, the four proximity sensors of the embodiment of FIG. 1.

In block 617, the process determines a trick. A trick triggers a game action, for example, flip move by a skateboarder. The process determines a trick from the position determined in block 613 and the proximity data processed in block 615. For example, a Benihana trick may be determined when the processed proximity sensor data includes near proximity to a rear sensor and the determined position includes that the rear of the game controller is lifted to a high position. In some embodiments, determining a trick may additionally include the current state of the video game. For example, a Fingerflip Left trick may be determined when the processed proximity sensor data includes close proximity to a front sensor, the determined position includes that the game controller is tilted to the left, and the previous state of the game was a Nose move. A trick may additionally be determined by a sequence of measurements. For example, a momentary detection of proximity to a left sensor at a middle range may be determined to be a Pushing trick.

In block 619, the process determines whether a trick was determined in block 617. If a trick was determined, the process continues to block 621; otherwise, the process returns.

In block 621, the process commands display of the trick determined in block 617. For example, when a Benihana trick is detected the process commands a display showing a skateboarder performing a corresponding trick. The trick may be displayed on video display, for example, the display unit of FIG. 1. The process thereafter returns.

Figure 7:
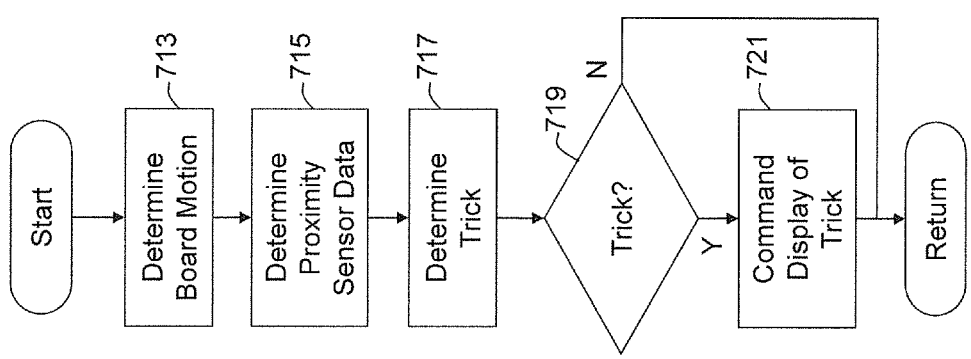
FIG. 7 is a flowchart of a process for processing proximity sensor inputs and velocity information in accordance with aspects of the invention.

FIG. 7 is a further flowchart of a process for processing proximity sensor inputs and motion information in accordance with aspects of the invention. In some embodiments, the process is performed by a video game controller, by a video game console, or partially by a video game controller and partially by a video game console. In some embodiments, the process utilizes a video game controller, such as the board-like controller of the embodiment of FIG. 1.

In block 713, the process determines motion of the video game controller. The process may acquire accelerometer data to utilize in determining the motion of the video game controller. In one embodiment, the process reads data from accelerometers in the video game controller. Preferably, the accelerometers are three-axis accelerometers and each accelerometer provides three measurements. Each measurement indicates the acceleration of the video game controller at the location of the video game controller. The process determines the motion of the video game controller from the accelerometer measurements via Newtonian physics equations. In some embodiments, the process may optionally or additionally receive measurements from a geomagnetic sensor and utilize geomagnetic measurements to determine the motion of the video game controller. The determined motion may include pitch, roll, and yaw data. Additionally, the determined motion may include time derivatives of the pitch, roll, and yaw data.

In block 715, the process processes proximity sensor data. In some embodiments, block 715 is similar to or the same as block 615 of FIG. 6.

In block 717, the process determines a trick. A trick triggers a game action in a manner similar to block 617 of FIG. 6. The process determines a trick from the motion determined in block 713 and the proximity data processed in block 715. For example, a 360 Kickflip trick may be determined when the processed proximity sensor data includes near proximity to a left sensor and the determined motion includes yaw. In some embodiments, determining a trick may additionally include the current state of the video game. A trick may additionally be determined by a sequence of measurements.

In some embodiments different tricks are determined for different combinations of motion and proximity data. For example, as illustrated in Table I below, a yaw board movement may result in a Shove It trick if a rear proximity sensor indicates an object very close to the rear proximity sensor, for example indicating a foot on a portion of the video game controller about the rear proximity sensor, while a yaw board movement may result in a board slide navigation operation (which may be used to stop motion of the board in a game virtual environment, for example) if the rear proximity sensor indicates no object within range of the rear proximity sensor. Similarly, a roll board movement may result in a steering navigation operation, a flip trick, or a grab trick depending on whether the rear proximity sensor indicates no object within range, an object very close, or a distant object respectively.

TABLE I

| Board Movement | Sensor | Result |
| --- | --- | --- |
| Yaw | None | Slide (navigation) |
| Yaw | Rear Very Close | Shove It Trick |
| Roll (Tilt) | None | Steer (navigation) |
| Roll (Tilt) | Rear Very Close | Flip Trick |
| Roll (Tilt) | Rear Distant | Grab Trick |

In block 719, the process determines whether a trick was determined in block 717. If a trick was determined, the process continues to block 721; otherwise, the process returns.

In block 721, the process commands display of the trick determined in block 717. The trick may be displayed on video display, for example, the display unit of FIG. 1. The process thereafter returns.

Although the invention has been described with respect to certain specific embodiments, it should be recognized that the invention comprises the novel and unobvious claims supported by this disclosure, along with their insubstantial variations.

The invention claimed is:

1. A video game system, comprising:
a video game controller in the form of a housing with an elongate upper surface and a lower surface coupled to the upper surface by sidewalls, the upper surface having a substantially flat portion for a user standing thereupon, the housing containing a position related sensing device, an object proximity sensing device for sensing a distance to an object external to the housing, a signal transmitter, and circuitry coupling the position related sensing device and the object proximity sensing device with the signal transmitter such that the signal transmitter may transmit signals indicative of information of the position related sensing device and signals indicative of information of the object proximity sensing device; and
a video game console including a processor configured by program instructions to determine position of the housing from values of the signals indicative of information of the position related sensing device and to command display of a game character performing operations using a board in a virtual environment based on values of the signals indicative of information of the position related sensing device and values of the signals indicative of information of the object proximity sensing device, with the game character performing different operations using the board for different combinations of values of the signals indicative of information of the position related sensing device and the values of the signals indicative of information of the object proximity sensing device, with the game character performing a first operation using the board when the values of the signals indicative of the information of the position related sensing device indicate a first position of the housing and the values of the signals indicative of information of the object proximity sensing device indicate a first object distance to the housing, the game character performing a second operation using the board when the values of the signals indicative of the information of the position related sensing device indicate the first position of the housing and the values of the signals indicative of information of the object proximity sensing device indicate a second object distance to the housing, and the game character performing a third operation using the board when the values of the signals indicative of the position sensing device indicate the first position of the housing and the values of the signals indicative of information of the object proximity sensing device indicate a third object distance to the housing.

2. The video game system of claim 1 wherein the first operation is a board navigation operation and the second operation is a board trick operation.

3. The video game system of claim 1, wherein the first operation is a board navigation operation, the second operation is a first board trick operation, and the third operation is a second board trick operation.

4. The video game system of claim 1, wherein the position related sensing device comprises at least one accelerometer.

5. The video game system of claim 1, further comprising an additional object proximity sensing device coupled by the circuitry to the signal transmitter, and wherein the object proximity sensing device is located proximate a front of the housing and the additional object proximity sensing device is locate proximate a rear of the housing.

6. The video game system of claim 5, wherein the object proximity sensing device and the additional object proximity sensing device each comprise an infrared sensor.

7. The video game system of claim 6, further comprising two further object proximity sensing devices, with a left object proximity sensing device of the two further object proximity sensing devices located proximate a left side of the housing and a right object proximity sensing device of the two further object proximity sensing devices located proximate a right side of the housing.

8. The video game system of claim 7 wherein the processor included in the circuitry is configured to trigger the left proximity sensing device and the right proximity sensing device at different times than the object proximity sensing device and the additional object proximity sensing device.

9. The video game system of claim 1, further comprising an additional object proximity sensing device coupled by the circuitry to the signal transmitter, and wherein the object proximity sensing device is located proximate a left side of the housing and the additional object proximity sensing device is locate proximate a right side of the housing.

10. A video game system, comprising:
a housing with an elongate upper surface having a substantially flat portion for a user to stand thereupon, the housing including a position related sensing device, an object proximity sensing device, and a transmitter to transmit information indicative of information of the position related sensing device and information indicative of information of the object proximity sensing device; and
a processor configured by program instructions to determine motion of the housing utilizing the information indicative of information of the position related sensing device and to command display of a game character performing different tricks using a board for different combinations of values of the information indicative of information of the position related sensing device and the information indicative of the information of the object proximity sensing device, the information indicative of the information of the object proximity sensing device being information indicative of position of an object external to the housing;
wherein the information indicative of information of the object proximity device is information indicative of the object external to the housing within three ranges of distances to the housing.

11. A peripheral for a video game, comprising:
a housing including at least one surface providing a deck for a user to stand thereupon;
at least one position related sensing device fixedly coupled to the housing to provide housing position related information;
at least one proximity sensor fixably coupled to the housing to provide object detection information of objects external to the housing, the object detection information including information indicative of distance between the object and the housing;
circuitry coupled to each proximity sensor, the circuitry configured to generate a signal indicative of which of at least three of a ranges of distances the distance between the object and the housing is within; and
a transmitter to transmit information of the housing position related information and information of the signal indicative of which of a plurality of ranges the distance between the object and the housing is within.

12. The peripheral of claim 11, wherein the plurality of ranges of distances consists of four ranges of distances.

13. The peripheral of claim 12, wherein the at least one proximity sensor comprises an infrared detector.

14. The peripheral of claim 12, wherein the deck is substantially in the shape of a deck of a skateboard.

15. The peripheral of claim 14, wherein the at least one proximity sensor comprises at least one proximity sensor about a forward area of the deck and at least one proximity sensor about a rear area of the deck.

16. The peripheral of claim 15, wherein the at least one proximity sensor further comprises at least one proximity sensor about a left side of the deck and at least one proximity sensor about a right side of the deck.

17. The peripheral of claim 14, wherein the at least one proximity sensor comprises at least one proximity sensor about a left side of the deck and at least one proximity sensor about a right side of the deck.

18. The peripheral of claim 11, wherein at least one of the at least one position related sensing device comprises an accelerometer.

19. The peripheral of claim 18, wherein the accelerometer is within the housing.

20. The peripheral of claim 19, wherein the circuitry comprises a processing circuitry housed within the housing, the processing circuitry configured to provide the transmitter the information of the housing position related information.

21. The peripheral of claim 11, wherein the a least one position sensing device comprises two accelerometers.

22. The peripheral of claim 21, wherein each of the two accelerometers comprises a three-axis accelerometer.

* * * * *